United States Patent [19]

Kuwabara et al.

[11] Patent Number: 5,028,303

[45] Date of Patent: Jul. 2, 1991

[54] ELECTROLYTIC FINISHING METHOD

[75] Inventors: Youhei Kuwabara, Fukuroi; Teruo Asaoka, Kakegawa; Yasuhiro Iwasaki, Mori; Haruki Sugiyama, Hamamatsu; Yoshiharu Suzuki, Kakegawa, all of Japan

[73] Assignee: Shizuoka Seiki Co. Ltd., Fukuroi, Japan

[21] Appl. No.: 333,946

[22] Filed: Apr. 6, 1989

[30] Foreign Application Priority Data

Apr. 8, 1988 [JP] Japan ................................. 63-87786

[51] Int. Cl.$^5$ .................... B23H 3/02; B23H 11/00
[52] U.S. Cl. ........................ 204/129.2; 204/129.43; 204/231
[58] Field of Search ............ 204/129.2, 129.43, 129.5, 204/435, 231

[56] References Cited

U.S. PATENT DOCUMENTS

| | | | |
|---|---|---|---|
| 3,219,564 | 11/1965 | Wilkinson | 204/231 X |
| 3,385,947 | 5/1968 | Inoue | 204/129.2 X |
| 3,463,720 | 8/1969 | Wilkinson et al. | 204/129.2 X |
| 3,873,512 | 3/1975 | Latanision | 204/129.2 X |

FOREIGN PATENT DOCUMENTS

60-44228  3/1985  Japan .
61-71921  4/1986  Japan .

*Primary Examiner*—Donald R. Valentine
*Attorney, Agent, or Firm*—Armstrong, Nikaido, Marmelstein, Kubovcik, Murray

[57] ABSTRACT

A working electrode is positioned to form a predetermined gap between the working electrode and a surface of a work, and the electrode and the work are submerged in an electrolyte. Pulses are applied to the working electrode to machine the work. A pair of standard electrodes are set in the electrolyte, and electric energy in the form of a pulse is applied to the standard electrodes. Current flowing between the standard electrodes is detected and the current density of the current flowing between the working electrode and the work is controlled based on the detected current.

3 Claims, 7 Drawing Sheets

ELECTROLYTIC FINISHING METHOD

BACKGROUND OF THE INVENTION

The present invention relates to a method for finishing a surface of a work by electrolytic machining, and more particularly to a method for finishing the surface to a lustrous surface at a high speed.

Japanese Patent Applications Laid-Open 61-71921 and 60-44228 disclose electrolytic machines. In the machine, liquid electrolyte such as sodium nitrate solution or sodium chloride solution is continuously passed between an electrode and a work at a high speed during machining, so that residual products such as particles of eroded metal from the work, hydrogen gas, and others are discharged from the gap between the electrode and the work.

However, in the case of the work having a complicated three-dimensional shaped recess, it is impossible to pass the liquid electrolyte through the gap having a complicated shape at a constant speed. The accuracy of the product is greatly influenced by the irregularities in the electrolyte flow. In addition, the concentration of the electrolyte at an outlet of an electrolyte tank is different from the concentration at an inlet, even if the pressure of the liquid is increased. Therefore, the machining condition dependent on the concentration of the electrolyte between the electrode and the work changes with machining position. As a result it is difficult to finish the work with accuracy. Further, in order to get a product having a high quality, it is necessary to control current density dependent on the surface area of the work. However, it is difficult to measure and calculate the surface area of the work having a complicated shape. Accordingly, it is impossible to produce an accurate product having a high quality of lustrous surface.

SUMMARY OF THE INVENTION

The object of the present invention is to provide an electrolytic finishing method which may finish a surface of a work to a product having a lustrous surface with accuracy at high speed.

According to the present invention, there is provided a method for finishing a work including securing the work in an electrolyte tank, positioning a working electrode to form a predetermined gap between the working electrode and the surface of the work, supplying electolyte to the electrolyte tank so as to submerge the electrode and the work, applying electric energy in the form of a pulse to the working electrode, supplying clean electrolyte to the tank and draining the electrolyte including residual products.

The method comprises setting a pair of standard electrodes in said electrolyte, applying electric energy in the form of a pulse to the standard electrodes, detecting current flowing between the standard electrodes, and controlling the current density of the current flowing between the working electrode and the work based on the detected current.

The other objects and features of this invention will be apparently understood from the following description with reference to the accompanying drawings.

BRIEF DESCRIPTION OF DRAWINGS

FIG. 7b is a schematic side view of standard electrodes of FIG. 7a.

DETAILED DESCRIPTION OF THE PREFERRED EMBODIMENT

Figure 1:
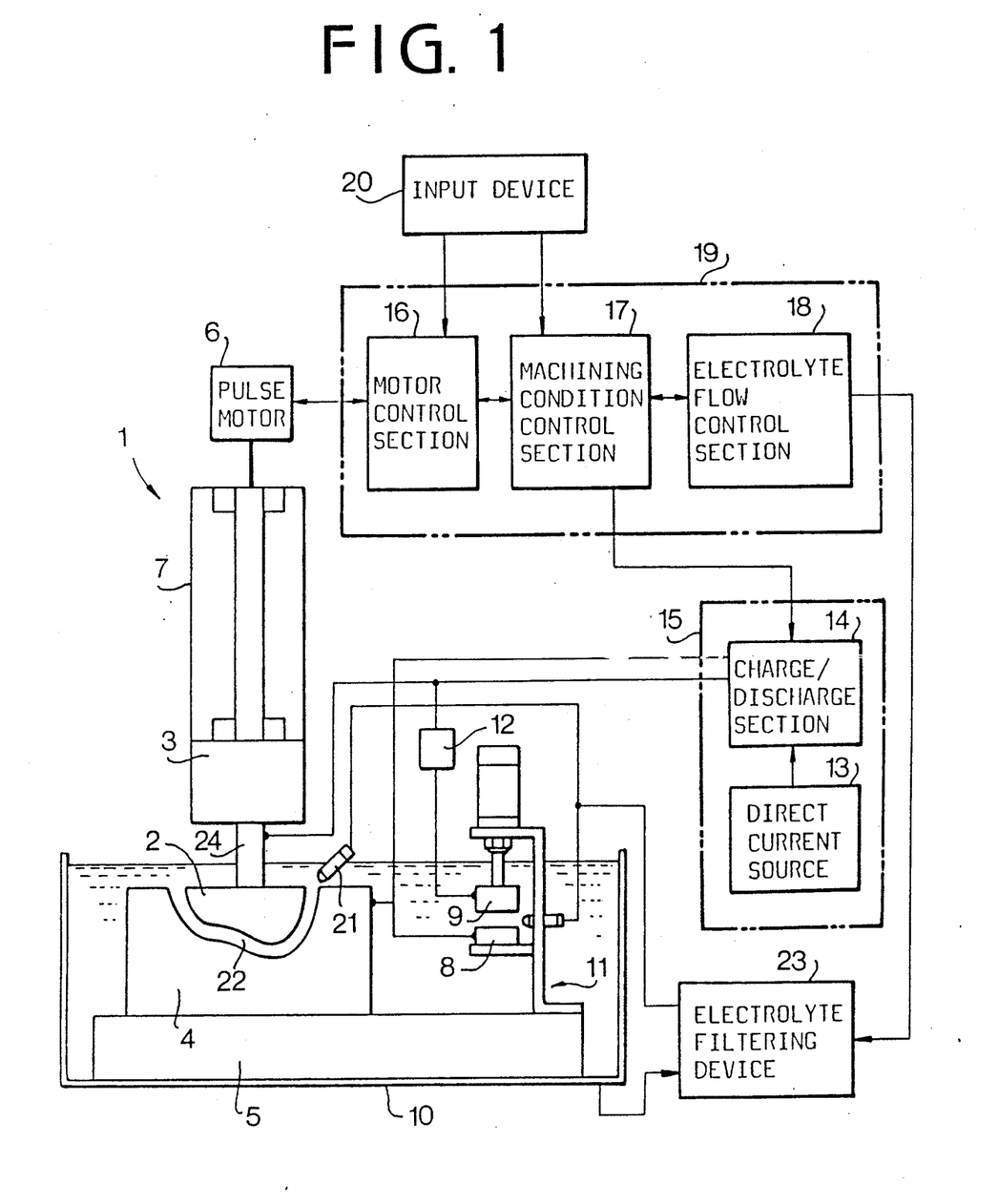
FIG. 1 is a schematic illustration showing a system of an electrolytic finishing machine according to the present invention.

Referring to FIG. 1, the electrolytic finishing machine 1 has an electrode holding device 3 for holding an electrode 2, a work fixing device 5 for fixing a work 4 in an electrolyte tank 10. The tank 10 contains electrolyte such as sodium nitrate solution or sodium chloride solution. The electrode 2 made of copper or graphite is secured to the lower end of a rod 24 of an electrode holding device 3. The holding device 3 is operatively connected to a pulse motor 6 through an electrode driving direction converter 7. The converter 7 is arranged to change rotary output of the motor 6 into axial movement of the rod 24.

The work 4 has a three-dimensional recess to be finished, which has been formed by an electrical discharge machine (not shown) with the electrode 2.

Output signals of the motor 6 are supplied to a motor control section 16 of a control unit 19, and motor 6 is operated by a control signal from the motor control section 16. The control unit 19 has a machining condition control section 17 and an electrolyte flow control section 18.

The work fixing device 5 is a table made of insulation such as ceramic material and the work 4 is secured to the table with bolts. A standard electrode fixing device 11 having a pair of standard electrodes 8 and 9 is disposed in the tank 10 and a current detector 12 is provided for detecting the current flowing between standard electrodes 8 and 9.

The system has a power source device 15 which comprises a direct current source 13, and a charge/discharge section 14. The charge/discharge section 14 generates a pulse of a current density (specifically means "peak current density") for a pulse duration dependent on the surface area of the recess, in response to a signal from the machining condition control section 17.

The system further has an input device 20 for inputting machining conditions, and an electrolyte filtering device 23.

The input device 20 is arranged to input various machining condition signals such as the material of the work, surface area of the work, machining depth, grades of dimension accuracy, surface roughness, and dimension of the gap 22 between the electrode 2 and the work 4. The signals are fed to the motor control section 16 and the machining condition control section 17. The electrolyte filtering device 23 is provided for receiving electrlyte including residual products, which is removed from the electrolyte tank 10, and for filtering the received electrolyte. The clean electrolyte is fed to the electrolyte tank 10 through a nozzle 21 oriented to the gap 22.

Figure 2:
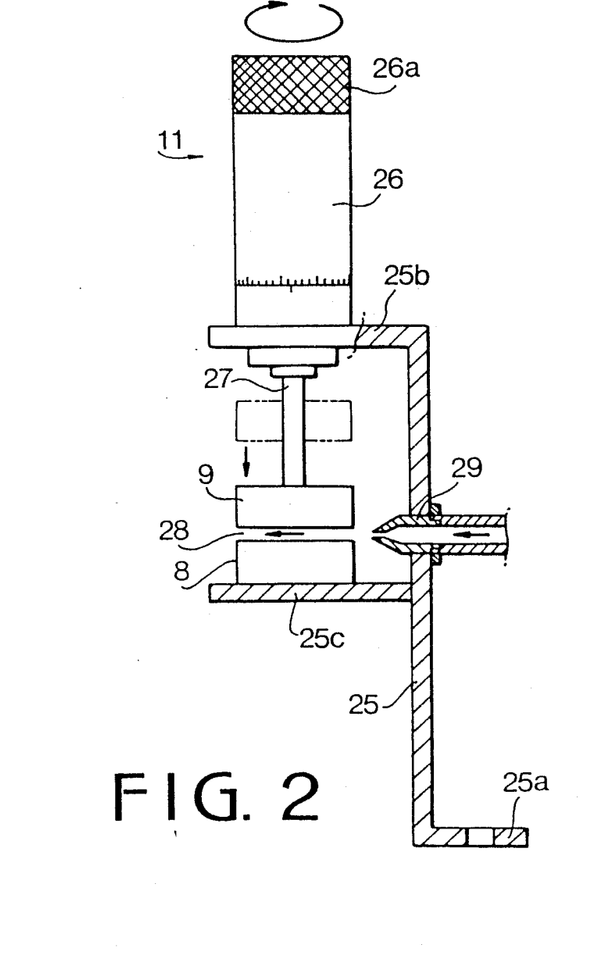
FIG. 2 is a sectional view showing a standard electrode fixing device of the system.

Referring to FIG. 2, the standard electrode fixing device 11 has a vertical frame 25 secured to the work fixing device 5 at a lower horizontal frame 25a, and a gap setting dial 26 mounted on an upper horizontal frame 25b of the frame 25. The standard electrode 9 is secured to a lower end of a rod 27 of the dial 26. The standard electrode 8 is secured to a central horizontal frame 25c of the frame 25 at a position corresponding to the standard electrode 9. The standard electrodes 8 and 9 are formed to have the same square shapes in plan views with the same surface areas. By rotating an operating nob 26a of the dial 26, the standard electrode 9 secured to the rod 27 is vertically moved, so that a gap 28 between the standard electrodes 8 and 9 is set to a predetermined value. An injection nozzle 29 is projected from the vertical frame 25 oriented to the gap 28 and communicated with the electrolyte filtering device 23.

Figure 3A:
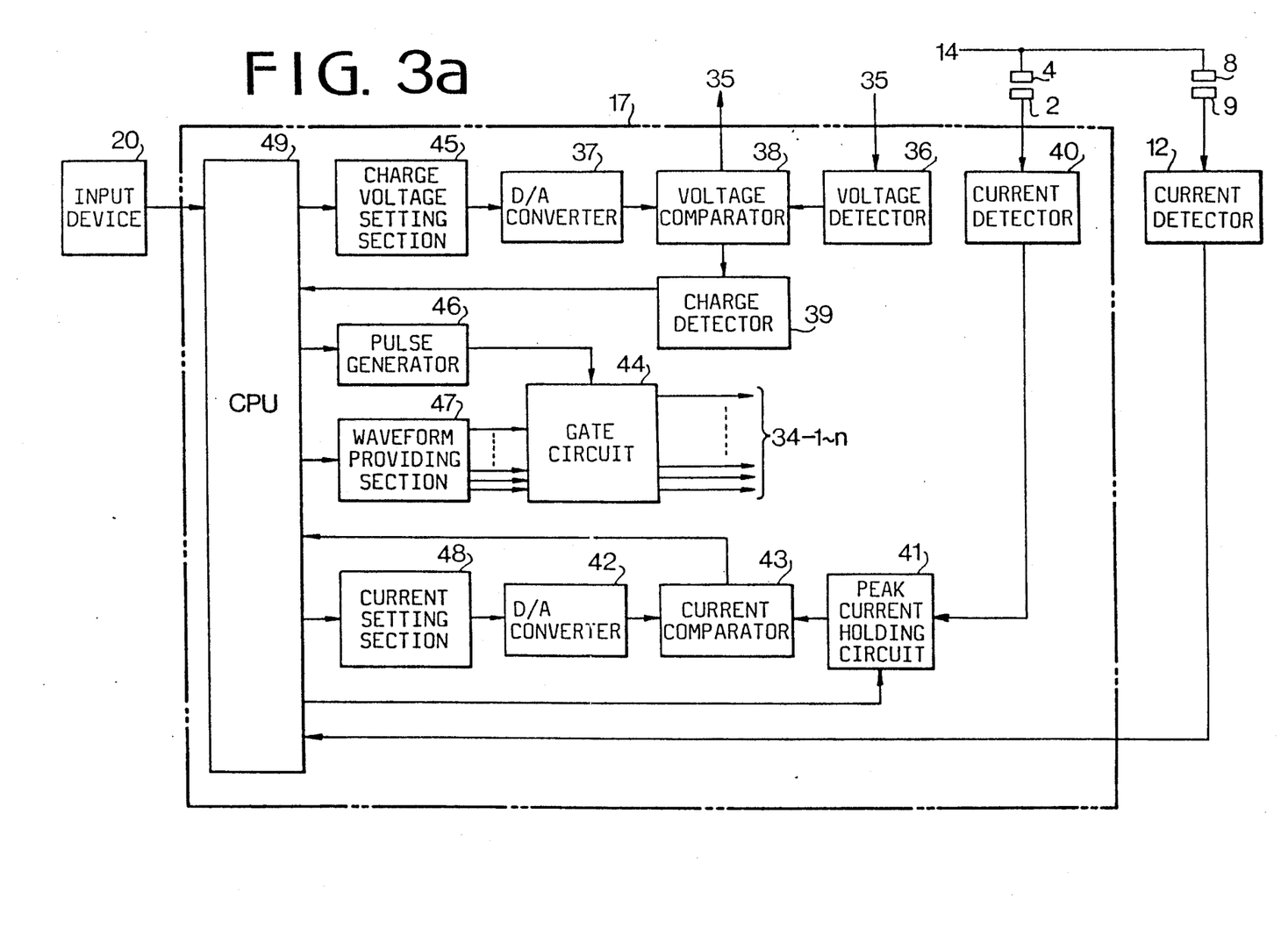
FIGS. 3a and 3b are block diagrams showing a system for supplying a current to an electrode, a work and a pair of standard electrodes.
Figure 3B:
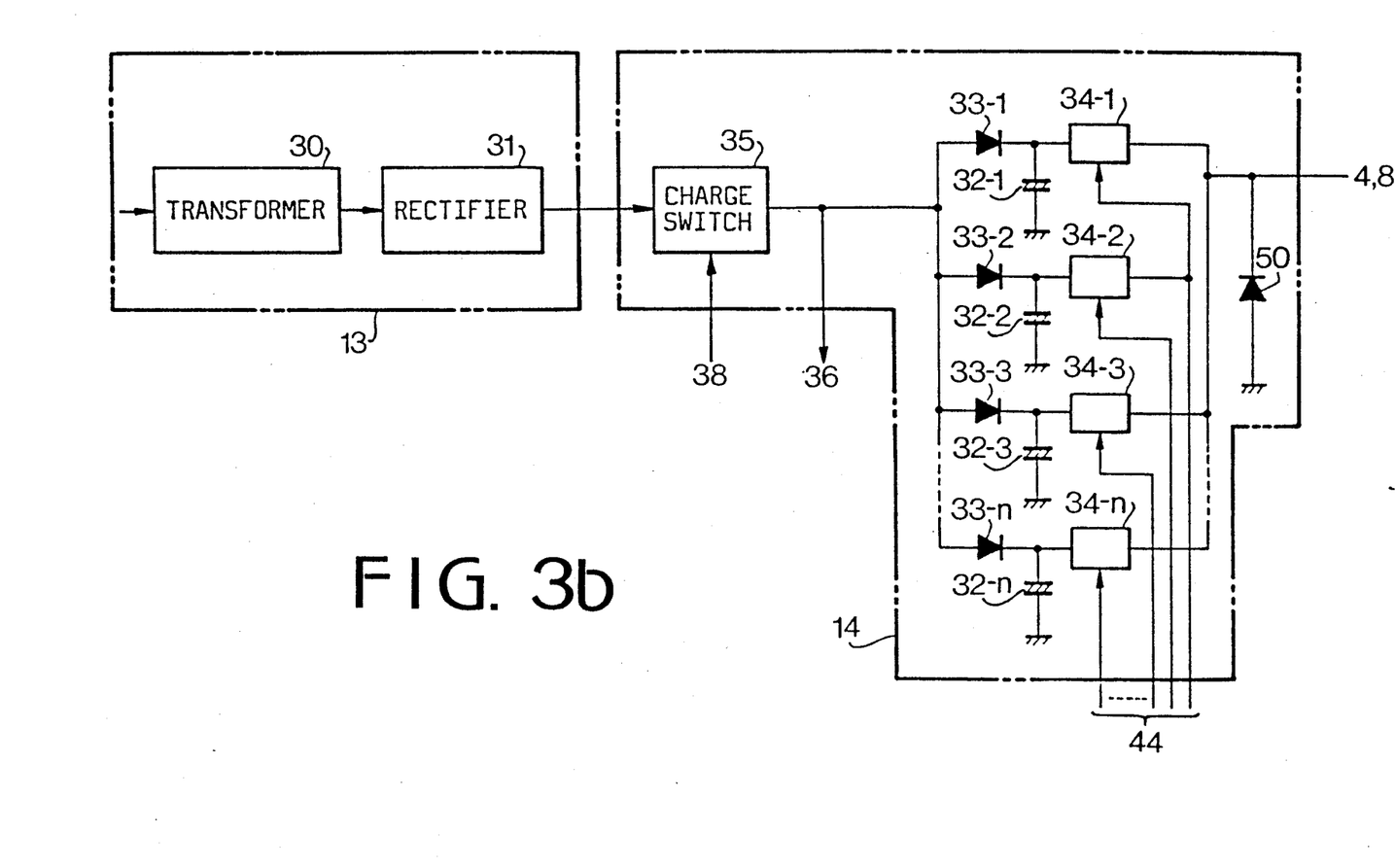

Referring to FIGS. 3a and 3b, direct current source 13 of the power source device 15 comprises a transformer 30 and a rectifier 31.

The charge/discharge section 14 has a plurality of capacitors 32-1 to 32-n which are connected in parallel with each other, diodes 33-1 to 33-n for preventing reverse current to the current source, switches 34-1 to 34-n for generating pulses, and a charge switch 35 responsive to a signal from a voltage comparator 38 for connecting the direct current source 13 to capacitors 32-1 to 32-n to charge each capacitor to a set value.

The machining condition control section 17 comprises CPU 49 applied with signals from the input device 20 to calculate machining and others, a waveform providing section 47 for providing current waveform to be discharged in the gap 22 between the work 4 and the electrode 2, a pulse generator 46 for generating pulses each having a predetermined pulse duration, a charge voltage setting section 45 for setting charge voltage applied to the capacitors 32-1 to 32-n, a current setting section 48, and a D/A converter 42.

A voltage detector 36 is provided for detecting the charge voltage applied to the capacitors 32-1 to 32-n, a voltage comparator 38 is provided for comparing a voltage from a D/A converter 37 corresponding to the charge voltage from setting section 45 with the charge voltage detected by the voltage detector 36, and a charge detector 39 is provided for detecting the completion of charging in response to the output of the comparator 38. The control section 17 further comprises a current detector 40 for detecting the current of the electric charge discharged between the work 4 and the electrode 2, a peak current holding circuit 41 for holding a peak current detected by the detector 40, a current comparator 43 for comparing the peak current from the peak current holding circuit 41 with the current supplied from the D/A converter 42, a gate circuit 44 for supplying an operation signal to switches 34-1 to 34-n in response to signals from pulse generator 46 and waveform providing section 47. There is provided a diode 50 for preventing the switches 34-1 to 34-n from breaking down by reverse current.

The machining method of the work is described hereinafter with reference to a flowchart of FIG. 4. The electrode 2 which was used at an electrical discharge machining for roughly machining the work 4 is attached to the rod 24 and the work 4 is attached to the fixing device 5 (step S51). The centering thereof is performed and then the standard electrode fixing device 11 is secured to the work fixing device 5. Various data and machining conditions such as rough surface area St of the work 4, surface area Sk of each of the standard electrodes 8 and 9, distance $\delta$ of the gap 22 between the electrode 2 and the work 4, predetermined times n1, n2 of machining cycles, and others are input as parameters by the input device 20 (step S52). The dial 26 is manually operated by rotating the operating nob 26a to set the gap 28 between the standard electrodes 8 and 9 to the same distance $\delta$ as the gap 22 (step S53).

A power button is depressed and the electrolyte machining starts. The electrode 2 is lowered to contact with the work 4 (step S54), and the position of the electrode 2 is stored in a memory in the CPU 49 as an original position. The electrolyte is supplied to the tank 10 (step S55). Thereafter, the electrode 2 is raised to provide a predetermined initial gap $\delta$ (step S56). When the electrolyte in the gap becomes stationary (step S57), a single pulse current for improving the surface roughness, which has a predetermined peak current density and a predetermined pulse width for providing the necessary electric energy is applied between the electrode 2 and the work 4 and between the standard electrodes 8 and 9 (step 58).

The pulse current is obtained based on the rough surface area St. Namely, the CPU 49 calculates the voltage corresponding to the surface area St by using a conversion table stored in a memory. The calculated voltage is applied to the charge voltage setting section 45.

After a predetermined number of pulse currents is applied, it is determined whether a predetermined number of times n1 of machining cycle is performed or not (step 59). If the number of machining cycle times n1 is completed, an output of the current detector 12 is fetched (step 60). The CPU 49 calculates current density ik in accordance with the current detected by the current detector 12 and the area Sk of the standard electrodes 8 and 9 (step 61). The current density ik is compared with a predetermined necessary current density ip. In dependence on the difference between current densities ik and ip, a voltage corresponding to the difference is applied to the charge voltage setting section 45 to set a new voltage (step 62). The voltage is applied to the work 4 to perform the machining. Alternatively, if the current density ik is different from the predetermined current density ip, voltage dependent on the current density ik can be set in the charge voltage setting section 45.

After a predetermined number of pulses are applied, the electrode 2 is raised by the motor 6 to expand the gap 22 (step 65). Clean electrolyte is injected from the nozzle 21 to the gap 22, thereby removing the residual products from the gap 22 and the tank 10 (step 66). The electrolyte in the tank 10 is then drained together with residual products. It is determined whether a predetermined number of times n2 of machining cycles is performed or not (step 67). If the machining cycles are not completed, the program returns to the step 56. Thus, the above described machining (steps 56 to 66) is repeated.

If the machining cycles are not completed at step 59, the current supplied between the electrode 2 and the work 4 is detected by the current detector 40 (step 63). It is determined whether a peak current thereof is a value of the current set in the current setting section 48 or not (step 64). If the peak current is the set current, that is, a predetermined current is applied to the electrode 2 and the work 4, the program goes to step 65. If the peak current is not the predetermined current, which means that the system is in an abnormal state, the machining is stopped (step 69). The abnormal current is caused, for example by a short circuit between the electrode 2 and the work 4. After the abnormal condition is removed, the program returns to step 56.

If the predetermined number of times n2 is completed at step 67, the pulse current is changed to a pulse current for finishing the work to a lustrous surface (step 68) and finishing machining processes which are the same as the processes 56 to 67 are performed. Thus, all machining processes are completed.

In the case that the number of times n1 of machining cycle is set to zero, the current density ip is obtained based on a first current applied to standard electrodes 8 and 9. This current density ip is applied throughout the finishing machining.

In the first embodiment of present invention, the standard electrodes 8 and 9 of the standard electrode fixing device 11 are disposed in the tank 10. Thus, the electrodes 8 and 9 are submerged by the working electrolyte in the tank 10. Accordingly, the electrolyte including residual products may influence on the calculation of the current density.

Figure 5:
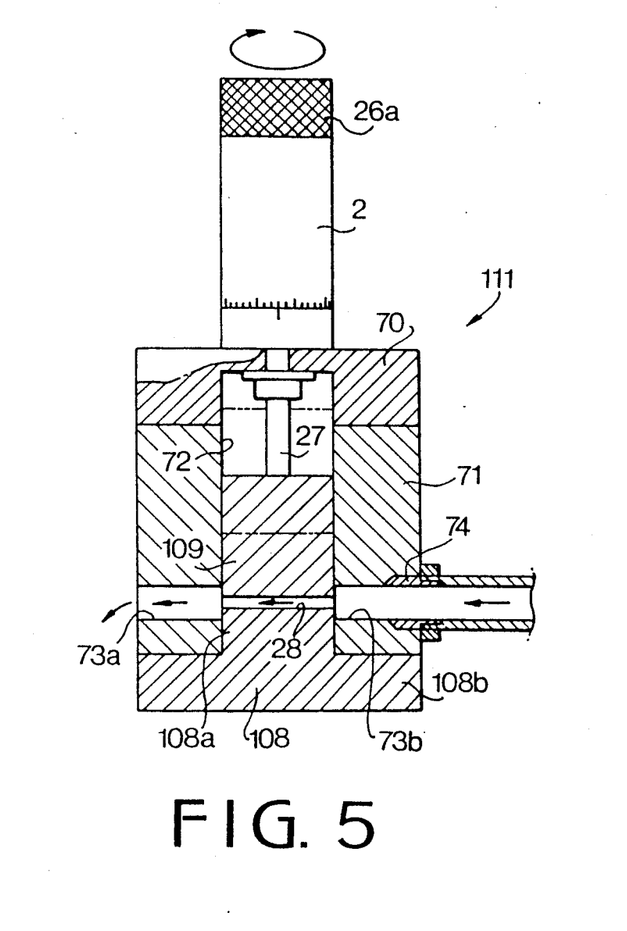
FIG. 5 is a sectional view showing a modification of the standard electrode fixing device.

FIG. 5 shows a modification of the standard electrode fixing device which resolves the problem caused by the working electrlyte. A standard electrode fixing device 111 comprises a block 70, on which the gap setting dial 26 is mounted, and a block 71 connected to the block 70. A vertical hole 72 is formed in the block 70 and passing through the block 71. A standard electrode 109 secured to the rod 27 is slidably mounted in the hole 72. A standard electrode 108 having a convex shape is secured to the lower end of the block 71 at a peripheral portion 108b. A projected portion 108a of the electrode 108 is engaged with the hole 72, corresponding to the standard electrode 109. Opposite holes 73a and 73b are formed in the block 71 adjacent an upper portion of the projected portion 108a to be communicated with the gap 28. A nozzle 74 is secured to an outer end of the hole 73b to be communicated with the gap 28. The nozzle 74 is communicated with the electrolyte filtering device 23. Thus, clean electrolyte without residual products is supplied to the gap 28. Accordingly, influence of the working electrolyte is prevented and the standard current can be more accurately detected.

Figure 6:
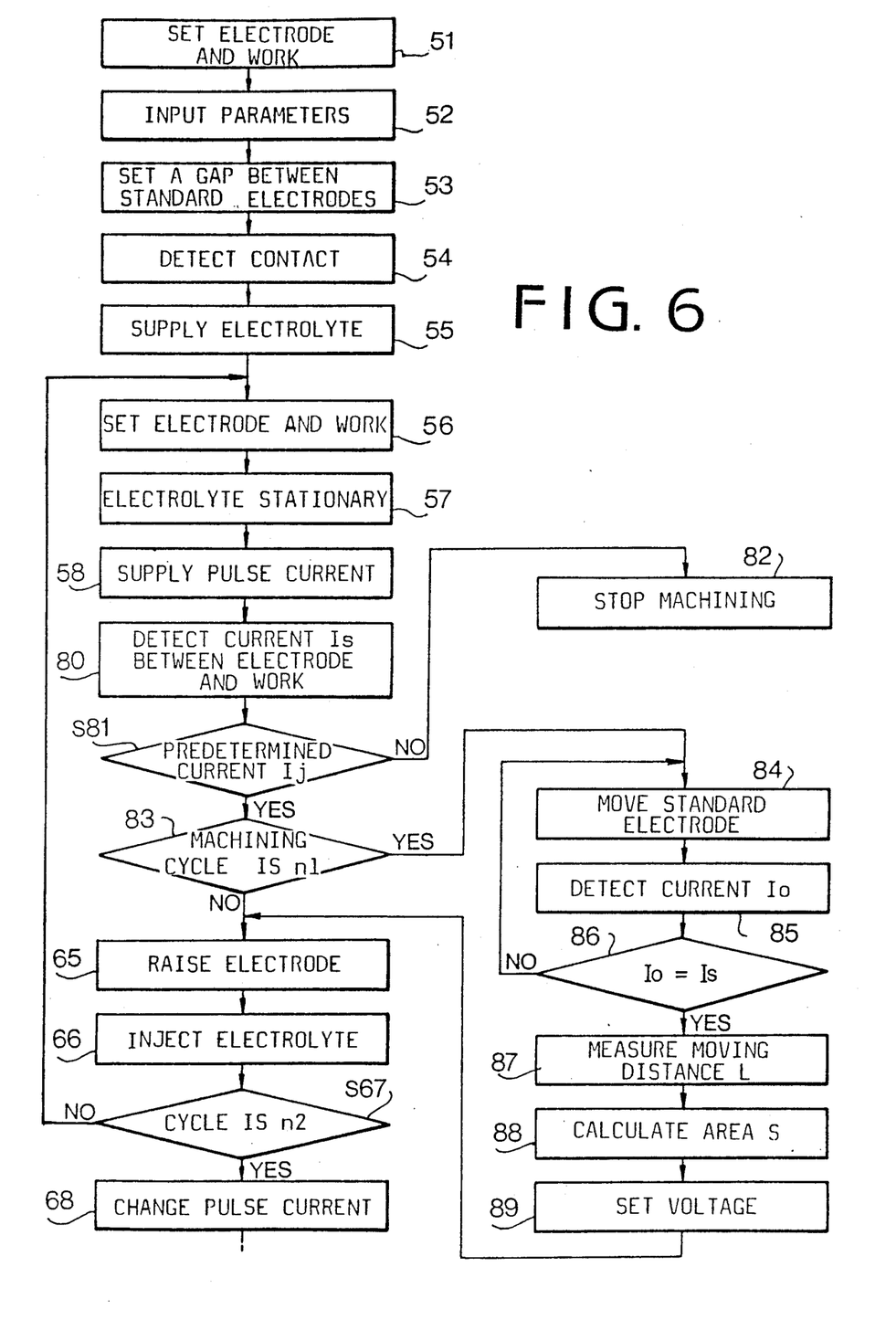
FIG. 6 is a flowchart showing another embodiment of the present invention.
Figure 7A:
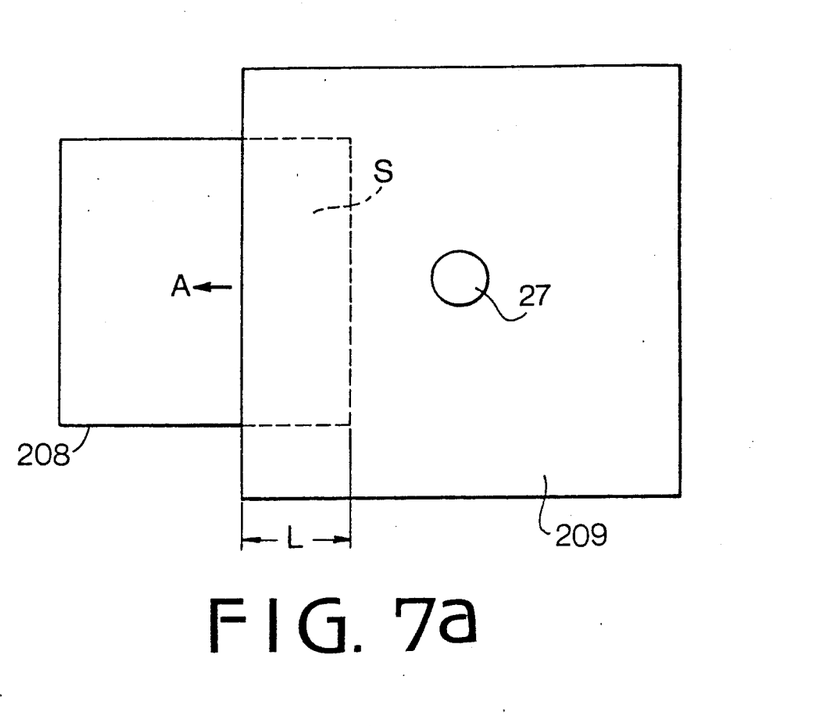
FIG. 7a is a schematic plan view showing a pair of standard electrodes employed in the embodiment of FIG. 6.
Figure 7B:
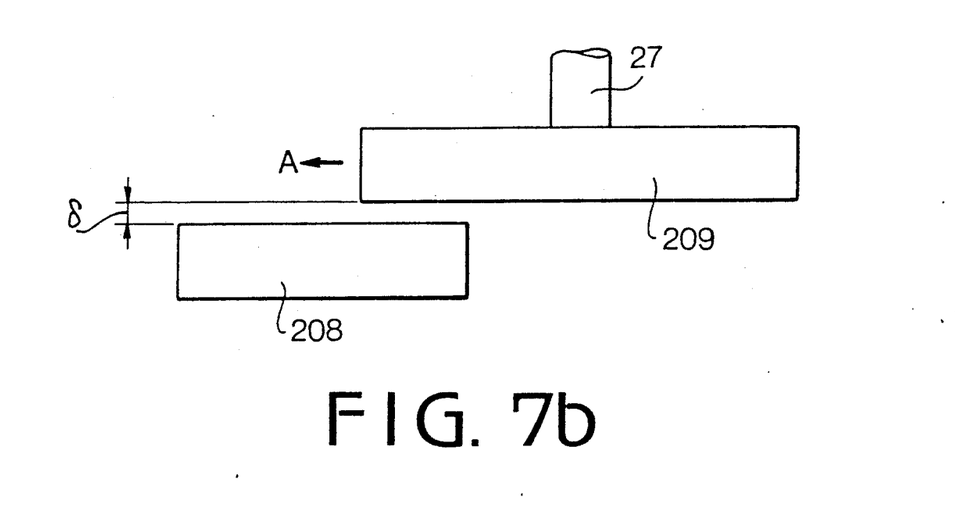

FIGS. 6 and 7 show a further embodiment of the present invention. As shown in FIG. 7, a surface area of an upper standard electrode 209 is larger than that of a lower standard electrode 208. The electrode 209 is secured to the rod 27 so as to be horizontally moved with respect to the electrode 208.

Figure 4:
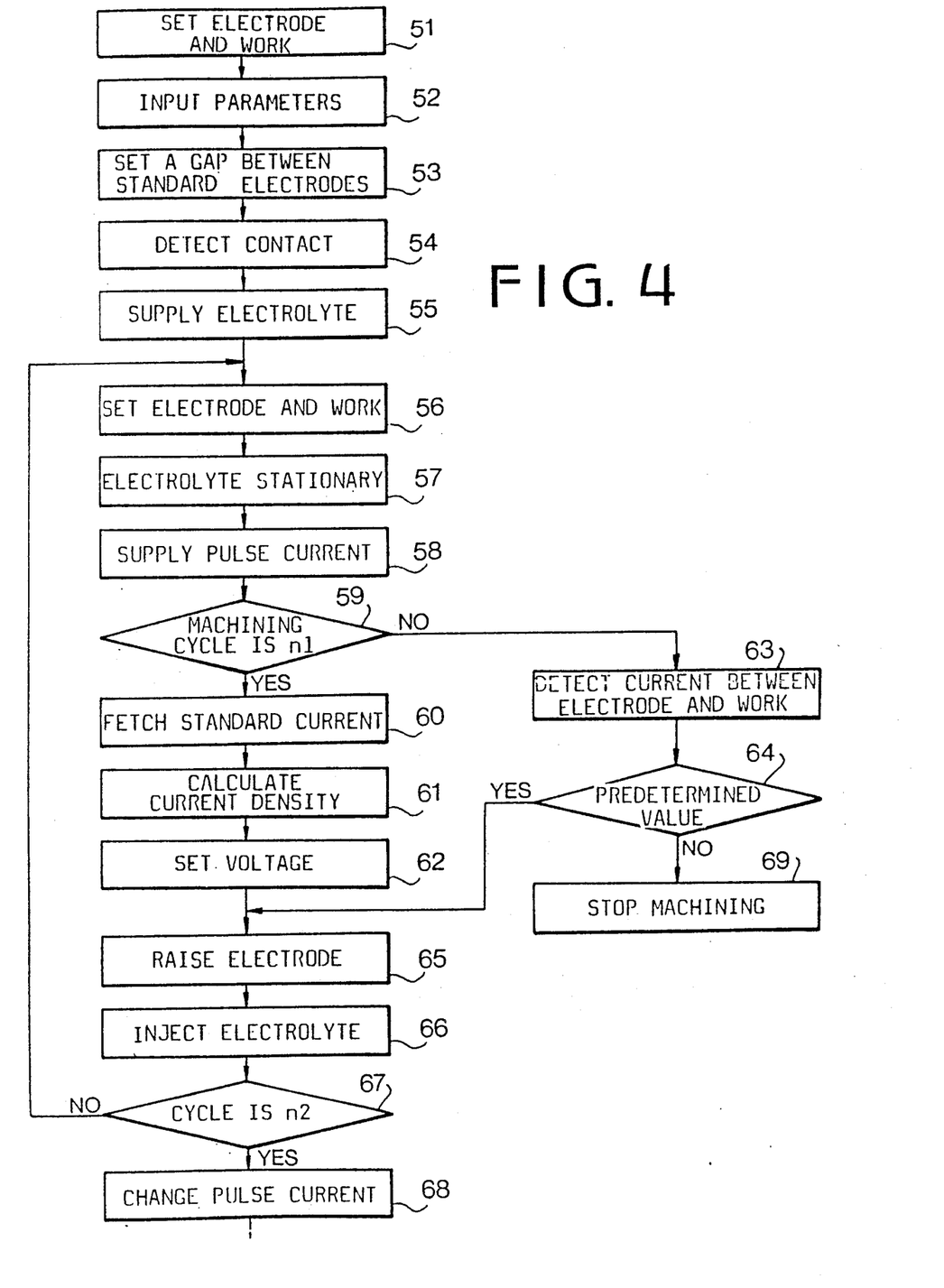
FIG. 4 shows a flowchart showing an operation of machining method.

Referring to FIG. 6, the machining processes of steps 51 to 58 are the same as the previous embodiment shown in FIG. 4. Current Is flowing between the electrode 2 and the work 4 is detected (step 80). It is determined whether the current Is is equal to a predetermined current Ij or not (step 81). If the current Is is not equal to the predetermined current Ij, the machining is stopped (step 82). If the current Is is equal to the current Ij, it is determined whether the predetermined number of times n1 of the machining cycle is performed or not (step 83). If the cycles are completed, the program goes to a step S84 for calculating surface area S of the overlapping portion of the standard electrodes (FIG. 7).

At step 84, the electrode 209 is horizontally moved to a position where the electrode 209 does not overlap with the electrode 208. Then, as the electrode 209 is moved in the direction shown by an arrow A, current Io flowing between the electrodes 208 and 209 is detected by the current detector 12 (step 85). It is determined whether the current Io equals to the current Is or not (step 86). The electrode 209 is moved until the current Io becomes equal to the current Is with repeating steps S84 and S85. When the current Io becomes equal to the current Is, moving distance L of the electrode 209 is measured (step 87). The surface area S corresponding to the moving distance L is calculated (step S88). Thus, the calculated surface area S represents the work surface area. Voltage corresponding to a predetermined necessary current density ip is calculated and the voltage is set in the charge voltage setting section 45 (step 89). The program proceeds to step 65 and the same machining processes as the previous embodiment are performed.

In accordance with the present invention, a pair of standard electrodes, each having a known surface area are provided in the electrolyte tank for detecting a standard current flowing there-between. The current density of the pulse current supplied to the work is controlled to a predetermined value based on the detected standard current. Thus, surface of the work can be finished to a lustrous surface with high quality. Since it is unnecessary to measure and calculate a surface area of a work with accuracy, the time of finishing the work can be reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for finishing a work including securing said work in an electrolyte tank, positioning a working electrode to form a predetermined gap between said working electrode and the surface of said work, supplying electrolyte to said electrolyte tank so as to submerge said electrode and said work, applying electric energy in the form of a pulse to said working electrode, supplying clean electrolyte to said tank and draining said electrolyte including residual products, the method comprising:

setting a pair of standard electrodes in said electrolyte;

applying electric energy in the form of a pulse to said standard electrodes;

detecting current flowing between said standard electrodes; and controlling the current density of the current flowing between said working electrode and said work based on the detected current.

2. The method according to claim 1 further comprising calculating current density of the current flowing between said standard electrodes, comparing the calculated current density with a predetermined necessary current density, and controlling the current density of the current flowing between said working electrode and said work in accordance with the result of the comparison.

3. The method according to claim 1 wherein said standard electrodes are provided in a chamber enclosed by blocks and clean electrolyte is supplied between said standard electrodes.

* * * * *